United States Patent [19]

Khenson et al.

[11] Patent Number: 5,694,600
[45] Date of Patent: Dec. 2, 1997

[54] METHODS AND APPARATUS FOR BOOTING A COMPUTER HAVING A REMOVABLE MEDIA DISK DRIVE

[75] Inventors: Eugene Khenson, San Francisco; Ronald J. Stephens, San Jose, both of Calif.

[73] Assignee: Iomega Corporation, Roy, Utah

[21] Appl. No.: 599,346

[22] Filed: Feb. 9, 1996

[51] Int. Cl.⁶ ..................................................... G06F 9/00
[52] U.S. Cl. ............................................. 395/652; 395/681
[58] Field of Search ........................ 395/375, 652, 395/651, 653, 681

[56] References Cited

U.S. PATENT DOCUMENTS

| | | | |
|---|---|---|---|
| 4,679,166 | 7/1987 | Berger et al. | 364/200 |
| 5,325,532 | 6/1994 | Crosswy et al. | 395/700 |
| 5,418,918 | 5/1995 | Vander Kamp et al. | 395/375 |
| 5,446,877 | 8/1995 | Liu et al. | 395/180 |
| 5,452,454 | 9/1995 | Basu | 395/700 |
| 5,463,766 | 10/1995 | Schieve et al. | 395/650 |
| 5,497,492 | 3/1996 | Zbikowski et al. | 395/652 |
| 5,542,082 | 7/1996 | Solhjell | 395/442 |

OTHER PUBLICATIONS

American National Standard on Information Technology—AT Attachment Interface with Extensions (ATA–2), Jan. 17, 1995.

Microsoft Corporation, Media Status Notification Support Specification (Rev. 1.02 1996).

*Primary Examiner*—Kevin A. Kriess
*Attorney, Agent, or Firm*—Woodcock Washburn Kurtz Mackiewicz & Norris LLP

[57] ABSTRACT

Method and apparatus are disclosed for booting a computer from a removable media disk drive. The method and apparatus are suited to an environment in which the removable media disk drive is configured as the first fixed disk drive in the computer. The removable media drive responds to testing during the power-up as if it contains media, whether or not media is present. Thus, the removable media drive is recognized by the BIOS. Additionally, a substitute master boot record is provided to the computer from a Read-Only Memory device contained on the removable media drive in response to a request for the master boot record of the media. Control of the boot sequence is thereby gained. The substitute master boot record loads a boot program that allows booting from any media or physical disk drive independent of the CMOS configuration.

35 Claims, 10 Drawing Sheets

METHODS AND APPARATUS FOR BOOTING A COMPUTER HAVING A REMOVABLE MEDIA DISK DRIVE

FIELD OF THE INVENTION

This invention relates generally to storage subsystems for computer systems. In particular, this invention relates to removable media storage devices configured as fixed disks in computer systems and methods and apparatus for booting the operating system from such devices.

BACKGROUND OF THE INVENTION

In recent years, personal computers (PCs), which includes work stations and the like, have grown increasingly sophisticated. During this period, the programs that run on PCs have increased in complexity and, correspondingly, in size. As a result, the capacity and usefulness of the current floppy disk drive, a standard feature in many PCs, have been surpassed by the programs it was designed to bear. Whereas, software developers previously distributed their products via floppy disk, they have increasingly been forced to use alternative methods, such as CD-ROM.

Despite the trend against the usefulness of the floppy disk drive, the need for the removability that the floppy disk drive provides has remained—primarily as a tool to provide diagnostic support in the event of a system failure. For example, if the fixed disk drive becomes corrupted, users turn to the floppy disk drive to attempt to recover. However, the limited capacity of a floppy disk poses severe constraints on the sophistication of the diagnostic tools that can be used. Vander Kamp et al., U.S. Pat. No. 5,418,918, suggests CD-ROM drives as a way of overcoming this problem. Unfortunately, CD-ROMs need special BIOSes and limit the user to the tools supplied by a particular software vendor. As a result, the user is unable to mix and match his preferred tools.

Recent years have also witnessed the development of removable media drives that have storage capacities characteristic of fixed disk drives and removability characteristic of floppy disk drives. These removable media drives have the capacity to store sophisticated diagnostic tools. Moreover, unlike CD-ROM drives, the user has the capability to customize the software on the media to suit particular needs. However, to fully utilize the capacity of such a removable media drive, in the current PC environment, it must be configured as a fixed disk. This requirement has complicated the integration of removable media drives into the PC system. For example, the typical PC attempts to test all drives before starting the boot sequence. If the removable media drive has no media, it will fail the test and not be recognized by the operating system after the system is booted. Thus, there is a need to allow the system to boot and recognize removable media drives, even when no media is present during the boot process.

If users could boot directly from a removable media drive, tremendous flexibility would be gained in, for example, diagnosing fixed disk failures. The capacity of removable media drives is such that a user can have a complete operating system customized to his/her desire along with diagnostic utilities of his/her choice. Unfortunately, conventional PCs only permit users to boot from the floppy "A" drive or the fixed "C" drive. If the removable media drive is configured as the "C" drive, conventional personal computer systems constrain the user to always have bootable media present in the drive at system start-up. Furthermore, the users ability to swap media in the removable media drive during system operation is also severely inhibited.

Thus, there is a need for methods and apparatus for booting a computer from a removable media drive configured as a fixed disk drive, without imposing any constraints on the users flexibility.

SUMMARY OF THE INVENTION

The present invention is particularly well suited for use in booting the Microsoft Disk Operating System into a Personal Computer systems (PC) via a removable media disk drive. According to an aspect of the present invention, the method of booting from any storage device attached to the processor of the personal computer comprises several steps. First, a read request to provide a master boot record from a storage device attached to the PC is made. Second, rather than retrieving a conventional master boot record, a substitute master boot record is received. Second, the substitute master boot record, confined to the constraints of the original master boot record, retrieves a universal boot program from the storage device. Third, the universal boot program scans all storage devices for bootable partitions. Fourth, the universal boot program loads a bootable partition as directed by a user and replaces the drive number in the boot sector. Fifth, the universal boot program waits for the operating system to load into the PC and changes the operating system code to the drive from which the boot sector was obtained.

According to another aspect of the present invention, a method and apparatus are provided for booting from any cartridge. This aspect allows a cartridge that was formatted on any PC with any CMOS settings to boot from the PC utilizing this aspect of the invention. For example, a SCSI formatted cartridge will boot on an IDE removable disk drive that embodies the present invention.

According to another aspect of the present invention, the removable media drive simulates the presence of media during booting of the operating system such that the operating system determines that the drive is available.

According to another aspect of the present invention, the removable media driver is loaded before the operating system and attached to the operating system after the operating system is sufficiently loaded into the PC. As a result, a user is not required to add a driver to the DOS CONFIG.SYS file.

According to another aspect of the present invention, a driver for the removable disk drive encapsulates the operating system disk services driver. The driver for the removable disk drive captures all calls to the removable drive and handles removability functions. Other calls, common to fixed disks are passed to the disk services driver provided by the operating system.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings: computer system.

DETAILED DESCRIPTION OF THE INVENTION

Figure 1:
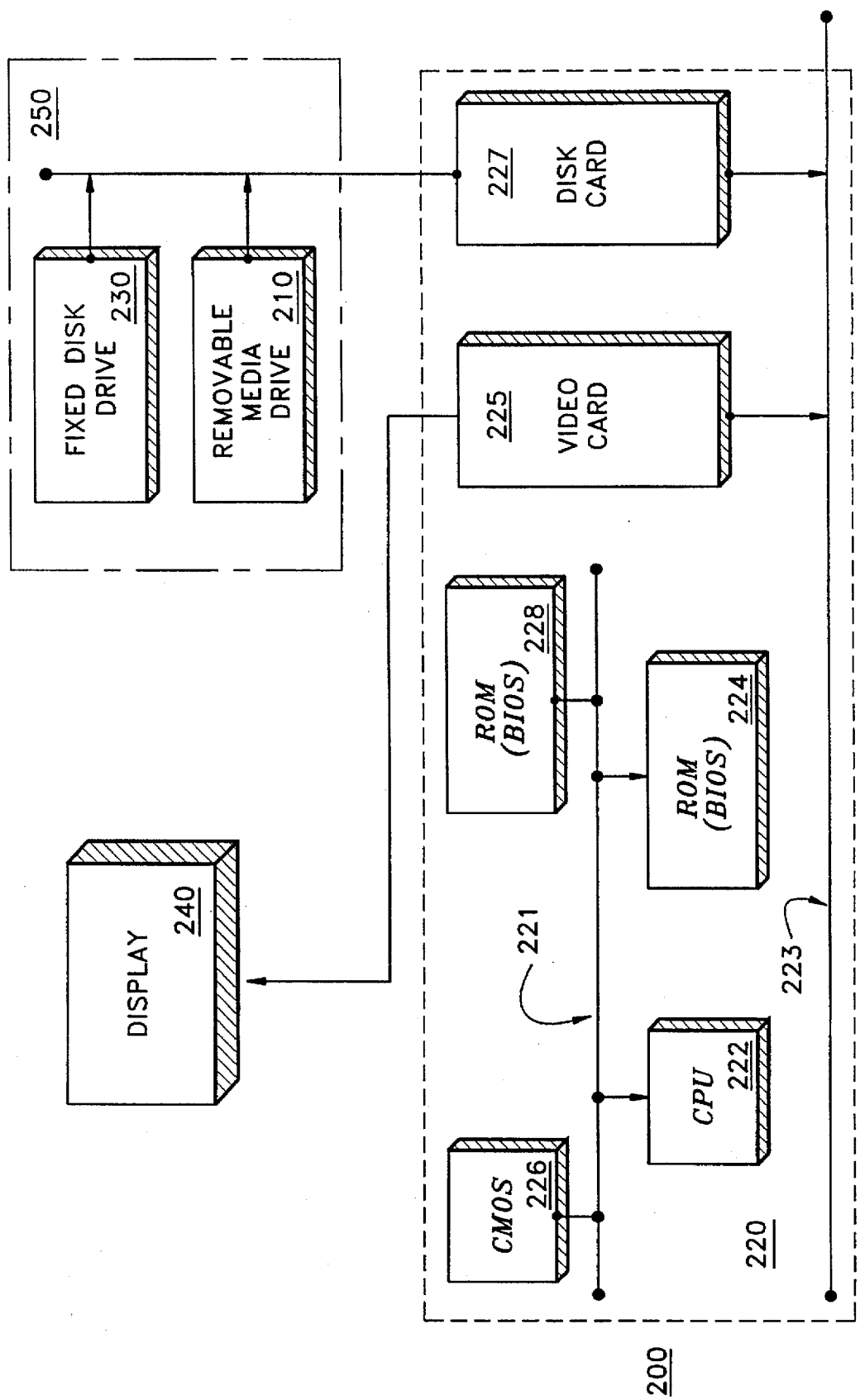
FIG. 1 is a block diagram of a conventional computer system.

A preferred embodiment of the invention will now be described with reference to the FIGURES. In the drawings, like numerals indicate like elements throughout. The description given herein is for exemplary purposes only and is not intended in any way to limit the scope of the invention. For example, the computer system and operating system environment described herein are merely exemplary and are not intended to limit the invention. All questions regarding the scope of the invention may be resolved by referring to the appended claims.

The sections below describe in further detail the system for integrating a removable media drive into a PC system. There are a variety of ways that such a drive can be integrated into a PC system. Section I details an exemplary PC system having an attached removable media disk drive. Section II follows with details of a presently preferred embodiment of a removable media drive that connects to the PC system via an IDE interface. That section also provides a description of the various states of the removable media drive as a function of media insertion and removal. A user of such a PC system, may configure the removable media drive in order to facilitate booting, or merely to access the drive after the boot process has completed. Thus, section III details a presently preferred embodiment of a method of the invention for assigning a drive letter and allowing the system to boot from the removable drive. Additionally, after the boot process is completed, the operating system cannot communicate directly with the removable drive. Extensions must be added to the operating system to enable the aspects of removability. According to a further aspect of the method of the present invention, section IV provides details for integrating a software driver into the operating system before the operating system has loaded.

I. System Overview

FIG. 1 is a block diagram of an exemplary computer system, such as an IBM PC or a system functionally compatible with the IBM PC, in which the present invention may be employed. Such a system is composed of a variety of subsystems. The more significant subsystems include the processor, the storage device subsystem 250, and other support devices, such as the video system (e.g., a display 240), a keyboard and the like (not shown).

Each of these subsystems is, in turn, made up of a variety of components. For example, and as used herein, the processor 220 represents a subsystem that comprises a CPU 222, random access memory (RAM) 224, read-only memory (ROM) 228, CMOS memory 226, an internal bus 221 to allow communication between the CPU 222 and its components, an AT bus 223 for connecting external devices, and controller cards 225, 227 connected to the AT bus 223 for communicating with other subsystems. For example, the storage device subsystem 250 will be interfaced to the processor 220 via a disk controller card 227. Similarly, a storage device subsystem 250 may comprise a plurality of storage devices, where each storage device may be one of a fixed disk drive 230, a removable media drive 210, a floppy disk drive (not shown), a magnetic tape drive (not shown), a CD-ROM drive (not shown) or the like.

The present invention relates to the relationship of the removable media drive 210 to the processor 220. Importantly, removable media drives have attributes of both fixed disk drives and floppy disk drives. Like fixed disk drives, removable media drives have much higher storage capacities and data transfer rates than currently available floppy disk drives. On the other hand, like floppy disk drives, the drive media of the removable media disk drives can be removed and replaced during the normal operation of the PC. These and other differences between fixed disk drives and floppy disk drives have resulted in PC operating system software and Basic Input/Output System (BIOS) code treating the two types of drives differently. For example, in a conventional IBM-compatible PC employing the DOS operating system floppy drives are configured as drive "A" or "B" and are configured as 1.2 or 1.44 megabytes. Fixed disks are configured as drive "C," "D" and so on and are configured with a cylinder, head and sector number that relates to the capacity of the drive. The cylinder, head and sector configuration allows capacities on the order of gigabytes. Significantly, at present, removability of fixed disk media is not fully supported by such a PC. Thus, a removable media drive cannot be simply configured as a fixed disk drive. The PC will not fully recognize its removability attributes, and problems will result.

In the storage device subsystem 250 of FIG. 1, several components in the PC 200 must interact to properly connect the processor 220 to the storage device(s) 250, particularly the removable media drive 210. Among those components are a disk controller card 227, a storage device (i.e., the removable media drive 210), a software driver residing in RAM 224, and a BIOS stored in ROM 228. Additionally as with a fixed disk drive, when the PC 200 is configured with the removable media drive 210, settings are stored in CMOS memory 226 (an area of memory that retains its values when the power is removed from the PC) that indicates the various parameters of the removable media drive 210 to the BIOS 228. Of particular relevance, these CMOS settings contain parameters (e.g., the number of logical cylinders, heads and sectors) that are used to communicate data between the processor 220 and the removable media drive 210.

To enhance the reliability of the connection between the processor 220 and the storage subsystem 250 and to enhance the interchangability of storage devices, several standard storage device interfaces have emerged since the introduction of the PC. For example, the Small Computer System Interface (SCSI) and the Integrated Drive Electronics (IDE) interface are among the more popular standard interfaces. The presently preferred embodiment utilizes an IDE interface, although those skilled in the art should recognize that features of the present invention will work equally well on other interfaces, such as SCSI.

To ensure compatibility between controller cards and storage devices from a variety of different vendors, a storage device must conform to industry standards. In the case of IDE, those standards are documented in the proposed American National Standard on Information Technology—AT Attachment Interface With Extensions (ATA-2), Jan. 17, 1995, which is hereby incorporated by reference.

In a conventional PC that uses an IDE interface, the processor will have an IDE interface controller card (e.g., 227) attached to the AT bus 223. When the processor 220 requires data from the removable media drive 210, the processor 220 will access the drive 210 through the standard IDE interface controller card 227. Moreover, in a typical PC 200, particularly one that uses the Microsoft Disk Operating System (MS-DOS), the operating system will communicate with the IDE storage device through a device driver. The device driver is conventionally loaded into the system by MS-DOS. According to an aspect of the present invention and as will be explained more fully below, because the PC may communicate with the removable media drive 210 before MS-DOS has loaded, it is advantageous to load the removable media driver before MS-DOS has loaded.

II. The Removable Media Drive and the IDE Interface

Figure 1A:
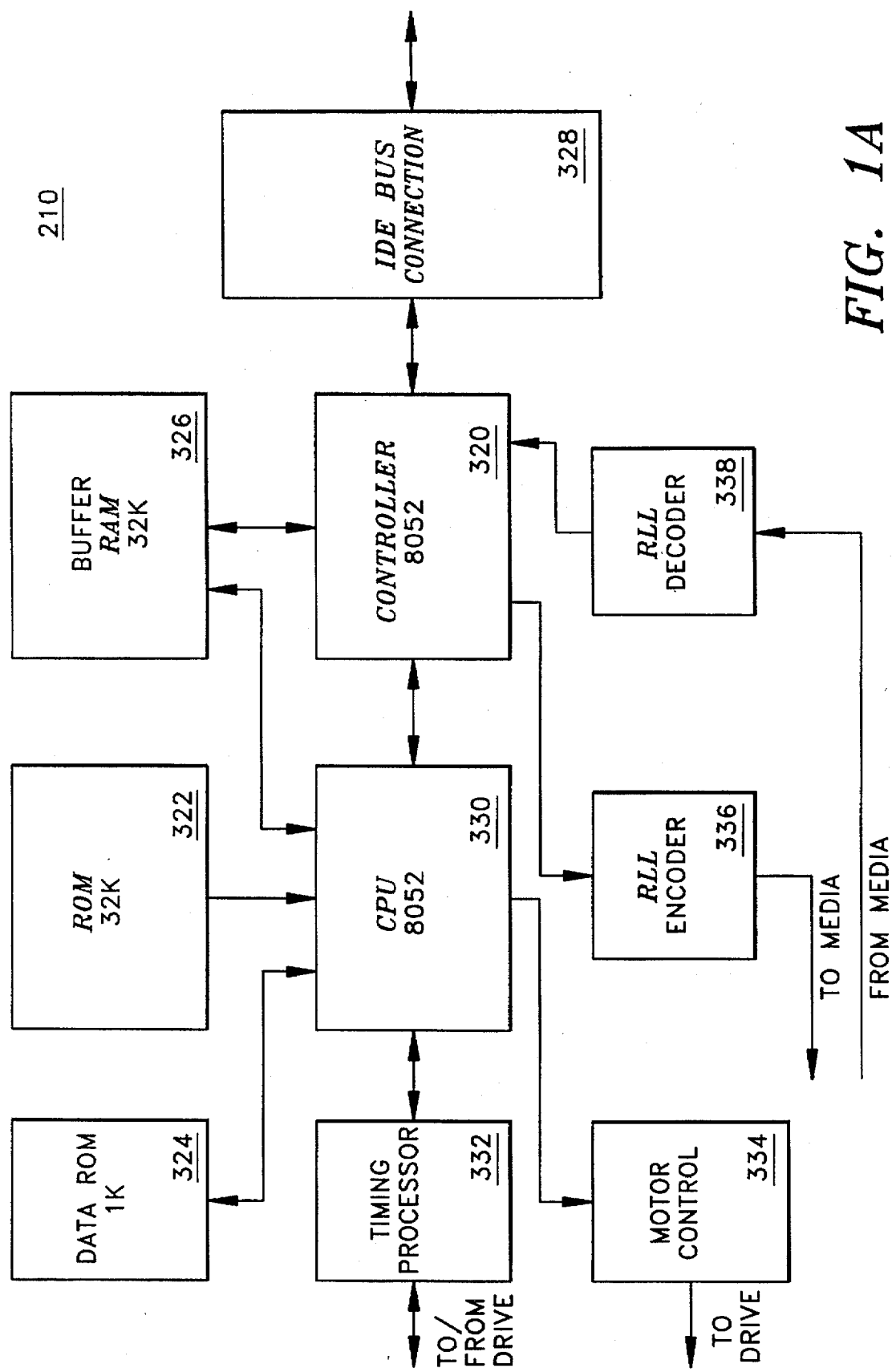
FIG. 1A is a block diagram of removable media drive controller hardware in accordance with a preferred embodiment of the present invention.

FIG. 1A presents a functional block diagram of the removable media drive 210 of the present invention as implemented for an IDE interface 227 to the processor 220. The drive electronics are comprised of several subcomponents: a 40 pin IDE bus connection 328; a CPU 330, for example, an 8052; a 1k Data RAM memory 324 for executing local programs; a 32k ROM memory 322 for storage of programs; a controller circuit 320, such as an AIC-7166 manufactured by Adaptec, which controls buffer management of data to and from the media, media interface, and processor interface via the IDE bus; a Timing Processor for providing timing signals to the servo motors and the read/write channel; motor control circuitry 334; an RLL encoder 336 for writing data to the media; and an RLL decoder for reading data from the media.

The removable media device is capable of communicating with the IDE controller card 227 (FIG. 1) via cylinder, head, and sector mode (hereinafter CHS mode) or logical block address mode (hereinafter LBA mode). In CHS mode, the controller card 227 presents a logical cylinder, head and sector from which data on the media is desired. The drive translates this information to a physical cylinder, head and sector to retrieve the data from the media. Importantly, the cylinder head and sector information set into CMOS 226 on the processor 220 defines the logical number of cylinder, heads and sectors on the drive and defines the translation used by the drive to determine where to physically retrieve the data on the media. In LBA mode, the controller card 227 communicates with the drive 210 through a linear mapping of sectors, starting at sector 0 and continuing to the last sector depending on the capacity of the drive.

Figure 1B:
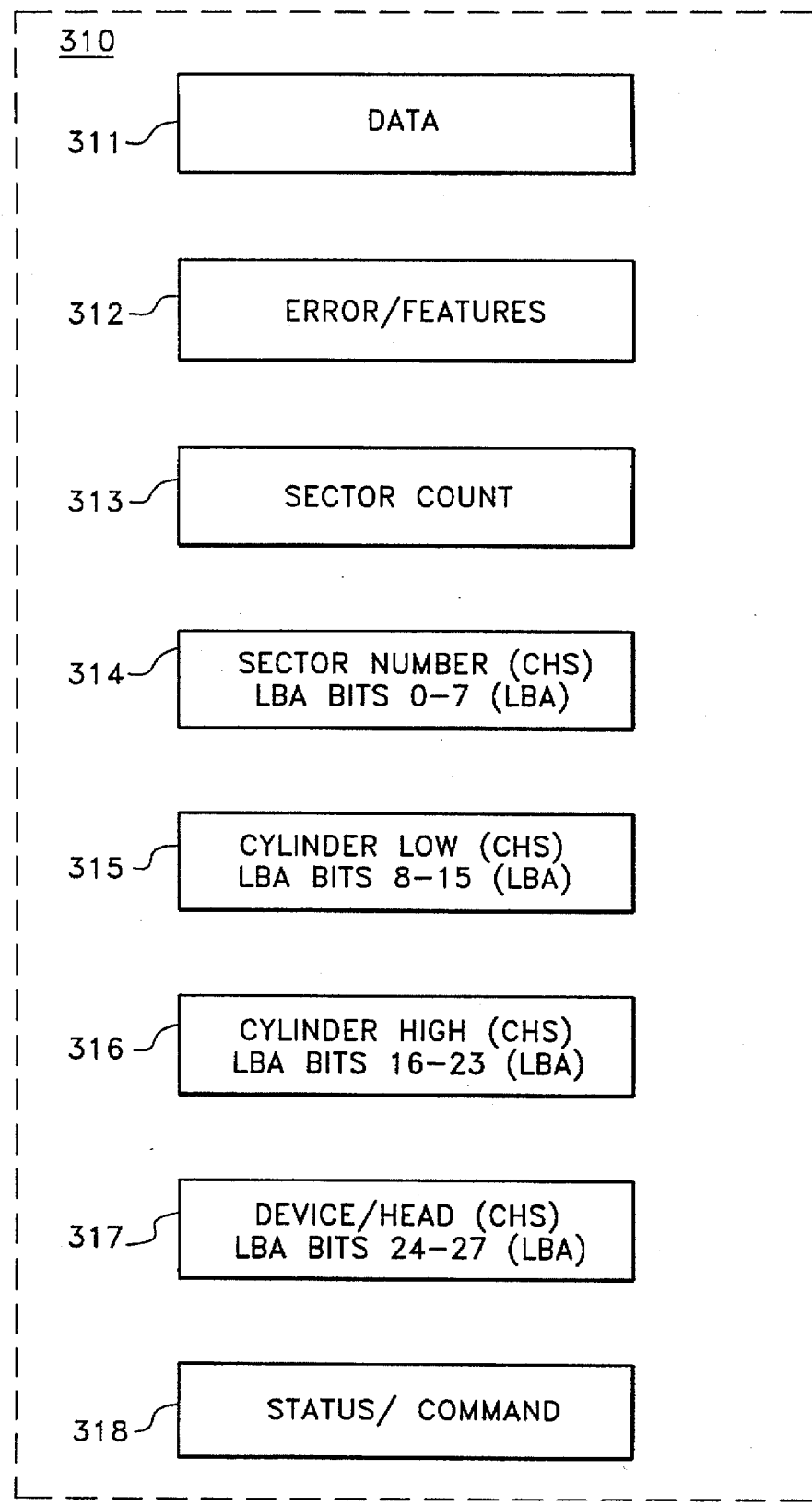
FIG. 1B is a graphical depiction of the command block registers specified in an IDE interface.

FIG. 1B is a graphical depiction of the command block registers used in an IDE interface for communication between the processor 220 and the removable disk drive 210. This set of registers resides within the controller 320 on the drive electronics. The command block registers 310 comprise eight registers: the data register 311 for reading and writing data to the media; the error/features register 312, which may contain the status of the last command executed by the drive or may be used to enable or disable features of the drive; the sector count register 313, which contains the number of sectors of data to be transferred on a read or write operation; the sector number register 314 which contains the starting sector number for media access in CHS mode and bits 0–7 of the LBA when operating in LBA mode; the cylinder low register which contains the low order bits of the starting cylinder address for media access and bits 8–18 of the LBA when operating in LBA mode; the cylinder high register which contains the high order bits of the starting cylinder address for media access and bits 16–23 of the LBA when operating in LBA mode; the device/head register which contains both device and sector addressing information, bit 6 is set to zero for CHS mode; and one for LBA mode, whenever bit 4 selects the device, and bits 3 through 0 comprise the head address in CHS mode or bits 24–27 of the LBA in LBA mode; the status/command register 318 which contains the status of the drive when read and is used to issue commands to the drive on writes. These registers are all defined in the ATA-2 specification and are used in the present embodiment according to that specification.

When the processor 220 wants to communicate with the removable media drive 210, commands are sent to the command register 318. For example, to read a block of data from the drive, the starting sector address will be loaded in to the cylinder, head and sector registers 314–317, and a sector count will be loaded into the sector count register 313. To load the registers, register information will be transferred to the drive 210 via the disk controller card 227. The register information will be sent over the IDE bus connection 328 to the controller 320. The controller will load the registers with the data provided. The controller 320, in conjunction with the CPU 330 will issue the proper commands to control the read process. In particular, the instructions to move the heads to the proper location on the media will be issued by the CPU 330 to the motor control 334 and the timing processor 332. The data provided will be decoded via the RLL decoder 338 and transferred to the buffer RAM 326, while the controller 320 passes the information back to the processor 220 through data register 311. A similar process occurs on a write to the media.

Figure 1C:
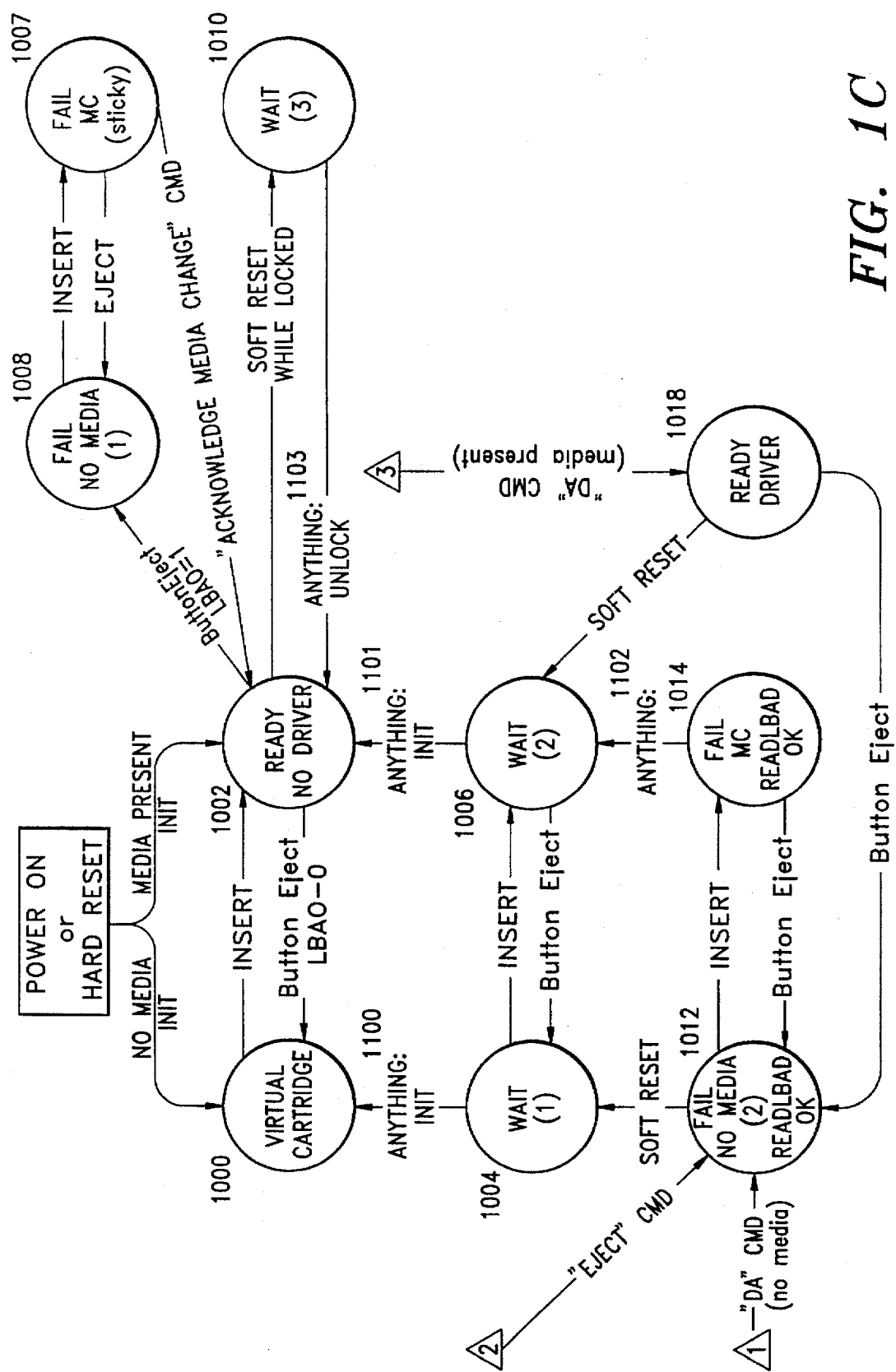
FIG. 1C is a state diagram of the operation of the removable media drive of the present invention.

FIG. 1C graphically depicts the states of the removable media drive of the present invention. In the present embodiment, the state transitions are controlled by a software program executing on the CPU 330 in the drive 210. The drive 210 must internally deal with a host of states to deal with the possibility of media absence, media presence and other complexities. The state diagram of FIG. 1C describes the possible states that removable media drive 210 will switch to internally. Moreover, based on these states the removable media drive will present information in the command registers in response to commands sent by the host. The commands that affect the states are all media access commands (READ, WRITE, etc.), and BIOS diagnostic commands (DIAG, RECAL, SEEK, VERIFY). Significantly, when the removable media drive 210 is in the VIRTUAL CARTRIDGE state 1000, the BIOS diagnostic commands are not processed by the drive, but instead indicate a good status (status register=50h). This forces the BIOS to recognize the drive as available to the system and ready for booting during the Power On System Test (POST). In any other state, the drive will process these commands normally (e.g., if the media is present, these commands will be processed as usual; if the media is not present, these commands will fail).

The drive distinguishes between the POST and normal PC operations. The distinction becomes necessary when no media is present during POST. After POST, when the removable media drive 210 is informed that the removable media driver is present in the processor 220, the drive 210 can safely fail media access and diagnostic commands. At that point, the removable media driver will take the necessary steps to inform the Operating System about fail conditions. On the other hand, if the removable media drive 210 is unaware of the presence of the removable media driver (as will be true at power on), it will not fail these commands because that would cause the BIOS to fail the drive test. As a result, the BIOS will exclude the removable media drive 210 from the list of available drives.

Determining the removable media driver's presence in the processor 220 is complex from the removable media drive side of the interface. For example, the driver may have been loaded, but then the user pressed Ctrl-Alt-Del to warm-reboot the PC system 200. In such a case, the removable media drive 210 does not receive a hard reset (as on Power-On), but rather only a soft reset will be issued by the BIOS. The same soft reset could have been issued to the drive after any failed command. For example, a read fault, followed by a legitimate soft reset to clear the error condition would cause a similar condition. But in the case of a warm reboot the removable media driver is no longer in processor RAM memory. The removable media drive 210 will recognize this situation and switch to the VIRTUAL CARTRIDGE state.

Additional complexity arises when the media is changed. The removable media drive 210 will fail subsequent media access commands and set the media change bit in the error register. If the removable media driver is present in the processor 220, this failure will happen only once, because the removable media driver recognizes and informs the Operating System of the media change. However, if no removable media driver is present, the fail condition can not be recovered, especially after soft reset. In such a case, the BIOS (without the removable media driver) will see the error condition and will try to clear it by sending a soft reset to the removable media drive 210.

The state machine depicted in FIG. 1C allows the removable media drive 210 to handle the complexities outlined above. To begin, the most reliable detection point is the soft reset. On warm reboot, the BIOS will send a soft reset to the drive. To distinguish between a soft reset generated by the driver in response to a failed command and a soft reset generated by the BIOS on a warm reboot, the removable media driver follows a soft reset that it generates with a DA command (a command specific to the removable media drive also referred to as "Get Media Status"). Thus, the removable media drive will determine that a soft reset followed by a DA command indicates the removable media driver 210 is still present in the processor 220. If the soft reset is not followed by the DA command, the removable media drive 210 will consider it a warm boot.

It is desirable to unlock the door if the system is warm re-booted to allow the user to change the media. However, it is not desirable to unlock the door if there is a soft reset in response to a command error. For these reasons, a soft reset switches the drive 210 into a special wait state (1004, 1006 or 1010). In these states, the removable media drive 210 waits for the next action from the processor 220. The removable media drive will transition out of these states on any of the following events (indicated by 1100, 1101, 1103 on the diagram): soft reset, READ LBA0, command reposting Media Change. If the removable media driver is present, and confirms its presence through the DA command, the door will not be unlocked, and the removable media drive 210 will return to the state 1012 or 1016. Any other command sent to the removable media drive 210 will unlock the door, because the drive 210 will assume a warm boot is being executed by the processor 220.

The states 1000 and 1002 are the initial states that the removable media drive 210 switches to on Power On. Before the removable media driver is installed in the processor 220, the removable media drive 210 will stay in these states depending on media presence. Before any processor 220 access is made to the drive, the user can safely eject and insert media, and no fault condition will be generated by the removable media drive 210. However, after the processor 220 accesses LBA0 while the media is present, the drive 210 cannot change the data returned to the processor 220 if the user ejects the cartridge or inserts another one. So, if the media is ejected after LBA0 was accessed from the media, the removable media drive 210 will switch to the state 1008—Fail No Media. In this state, any media access command will fail with the No Media bit set in the error register, and the drive will not allow further data retrieval. If the media is inserted, access is still inhibited by the state 1007, Fail Media Change sticky. The Operating System will be unable to understand the media change condition, so the drive 210 will not make the new media available to the Operating System. The only way for the Operating System to switch the removable media drive 210 out of this state is to send the Acknowledge Media Change command, as defined in the ATA specification, or for the removable media driver to send the DA command. The main distinction is that any driver or utility can send the drive 210 an ACK command, but that is not enough to switch to the drive 210 to the READY DRIVER state 1016. Such a switch requires a DA command. So, the ACK command will only clear the fail condition and return the removable media drive 210 back to state 1002. If another eject happens, the drive 210 will switch to state 1008 again.

III. The Boot Sequence

Figure 2:
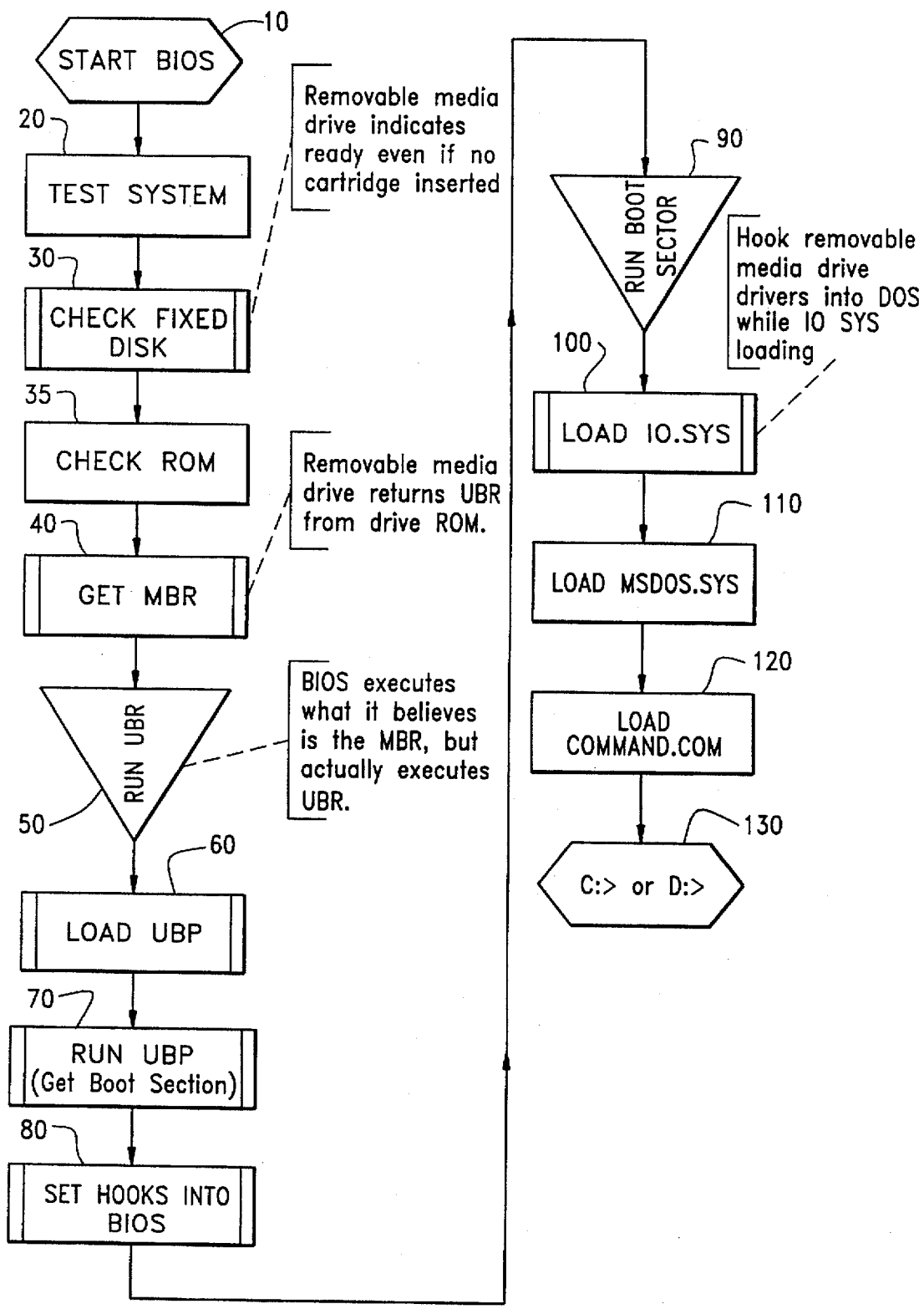
FIG. 2 is a flow chart of an operating system booting sequence incorporating an embodiment of the present invention.

FIG. 2 shows a flow chart of a PC boot sequence in accordance with the methods of the present invention. During the start sequence (referred to as "booting"), the goals are to ensure that the PC 200 is functioning properly and to load the operating system from the storage device subsystem 250 into memory for execution by the processor 220. To achieve these goals, the processor 220 runs a BIOS program contained in the ROM 228 (step 10). The BIOS, in turn, tests the sub-systems of the computer (step 20). Then, the BIOS checks the disk drives that are indicated in the CMOS 226. Of particular relevance to the present invention, the BIOS will issue commands to the fixed disk drives 210, 230 (step 30).

According to an aspect of the present invention and as will be described in more detail below, if no media is present in the removable media drive 210, the drive 210 simulates the presence of media in order to satisfy the BIOS (the VIRTUAL MEDIA state 1000 in FIG. 1C). The BIOS will then attempt to boot from the floppy drive in a conventional manner, details of which are known and need not be present here.

After the testing is completed, the BIOS checks for and executes ROM programs supplied by the interface controller cards connected to the various subsystems (step 35). When the PC 200 boots from a fixed disk 210, 230, the BIOS next requests the Master Boot Record (MBR) from the "C" drive (step 40).

According to an aspect of the present invention, the removable media drive 210 can be configured as the "C"

drive to control the boot process and account for removability. When configured as the "C" drive, the removable media drive 210 provides the processor 220 with a substituted MBR in response to the BIOS request. After checking the substituted MBR and believing it to be an authentic MBR, the BIOS transfers control to it (step 50). Subsequently, the substituted MBR (hereinafter "Universal Boot Record or UBR") gains control of the boot sequence.

As will be described more fully below, the UBR is a special boot record that, according to an aspect of the present invention, takes control of the boot sequence. The UBR then reads a more complete boot program, universal boot program (UBP), from the removable media drive (step 60). According to a feature of the present invention, both the UBR and the UBP are provided from the ROM 322 residing on the removable media drive 210. Thus, even if no media is present in the drive, the UBR and UBP gain control of the boot sequence when the removable media drive 210 is configured as drive "C."

According to a further aspect of the present invention, the UBP determines where to find the boot sector and, consequently, the operating system, i.e., on drive "C" or "D" or elsewhere (step 70). Thus, unlike a conventional PC, which can only boot from drive "C," a PC 200 configured with the present invention is capable of booting from any device capable of providing a boot sector, no matter what its drive address. After loading the boot sector, the UBP then replaces the pointer to the BIOS so that it can monitor the system loading process whenever certain BIOS calls are made (step 80). Control is then passed to the Boot Sector, and a seemingly conventional boot sequence resumes (step 90).

As will be described more fully below, if the operating system is MS-DOS, the UBP will awaken on certain predefined BIOS calls and attempt to attach the removable media drivers so that the removable media drive will properly operate in the MS-DOS environment (step 100). After the removable media driver is fully attached to MS-DOS, the removable media drive 210 is fully configured and the rest of the MS-DOS system loads (steps 110–130). Significantly, the removable media drivers are accessible to MS-DOS, even though the drivers were not loaded by DOS.

Now that the overall boot process has been described, each segment of the boot process wherein aspects of the present invention are employed will be described in further detail.

A. Assigning a Drive Address (Virtual Cartridge)

Figure 2A:
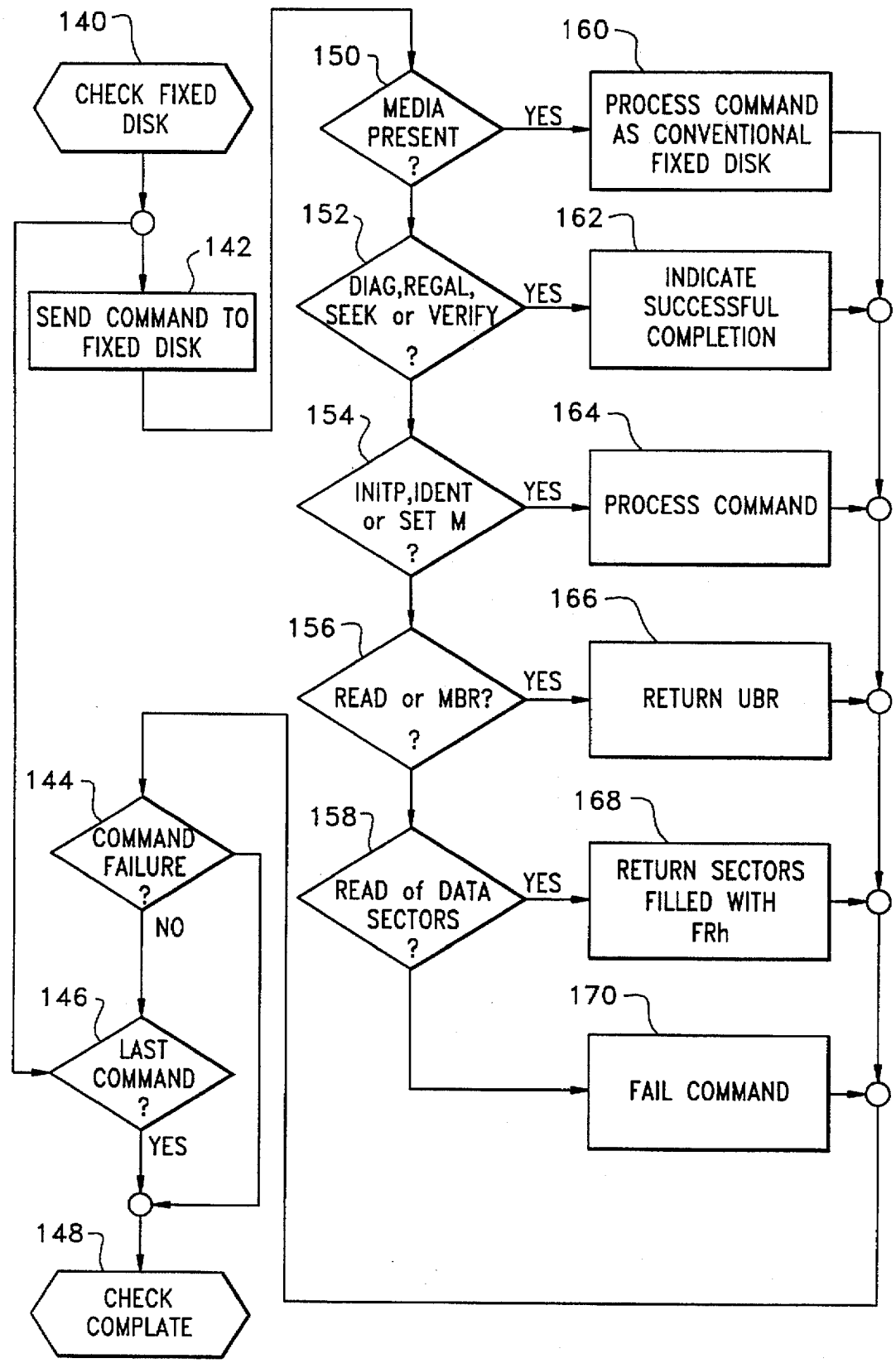
FIG. 2A is a flow chart of the removable media drive response to boot sequence testing, in accordance with the present invention.

As indicated in FIG. 2 at step 30, during a preliminary stage of the boot sequence, the BIOS checks the ready state of all drives 210, 230 configured as fixed disk drives. FIG. 2A provides a more detailed flow of the interaction of removable media drive 210 with the BIOS during this BIOS check stage. The steps outlined in FIG. 2A enable the system to recognize the drive 210 even if no media is present.

In a typical system using an IDE disk controller card 227, the BIOS will issue commands to the drive 210, 230, such as READ, VERIFY, IDENT and the like. If an IDE drive fails to indicate a ready status, the BIOS will not assign a physical drive number (e.g., 80h, 81h) and no drive letter will be assigned by MS-DOS when the system completes the boot sequence. Moreover, if the drive configured as the master IDE drive is not ready, the slave drive will not be checked. The removable media drive may not be ready for access during the boot sequence because no media is present. However, after the boot sequence, a user may desire to insert media and access the drive. If MS-DOS has not assigned a drive letter, the media will not be accessible. Thus, according to an aspect of the present invention the removable media drive 210 indicates ready during the boot sequence to satisfy the BIOS inquiries whether or not media is present.

Before testing the fixed drives, the BIOS first checks the settings in CMOS 226 to determine the parameters of the IDE drive 210, 230. According to the present invention, the user should configure the removable media drive 210 to represent a minimum cartridge size (e.g., 25 megabytes—128 cylinders, 12 heads, 32 sectors). Correspondingly, the removable media drive 210 responds to tests in a VIRTUAL CARTRIDGE mode (see FIG. 1C state 1000), i.e., as if it has a minimum cartridge capacity.

Referring to FIG. 2A, the BIOS sends a command to the removable media drive 210 (step 142). If the drive has media inserted (step 150), then the drive will perform all tests requested by the BIOS on the media as any normal fixed disk drive (step 160). If, on the other hand, no media is present in the drive 210 (step 150), the drive CPU 330 intercepts the commands and provides data to simulate the requested action. In this VIRTUAL CARTRIDGE mode, the removable media drive, then, will expect requests from the BIOS, which are designed to test the availability and readiness of the media. If the command is one of DIAG, RECAL, SEEK or VERIFY (step 152), a response will be provided in the status register 318 and error register 312 indicating to the BIOS that the command was successful (step 162). If the command is INITP, IDENT or SET MULTIPLE (154), the command will be processed and success will be indicated in the status register 318 (step 164). Additionally, if the command was IDENT, words 57–58 and 60–61 of the identification data are set to zero indicating that there are no sectors available (step 164). If the command is a read of the master boot record (step 156), an artificial master boot record is provided from drive ROM 322 (step 166). Requests to read from sectors other than the master boot record provide data as F6 hexadecimal (steps 158 and 168). Any other commands received will cause a failure to be reported in the status register (step 170).

When the BIOS then checks the status register 318 (step 144), if the command was successful, the BIOS will continue testing the drive until all of the commands have been issued (step 146). After completion (step 148), the BIOS is satisfied that the removable media drive 210 is ready, a physical drive number will be assigned to the drive (e.g., 80h corresponding to drive letter "C") and the boot sequence will continue. When the boot sequence is finished, the removable media drive 210 will be fully recognized and accessible by the BIOS and, subsequently, DOS. Importantly, if the removable media drive 210 is listed as the first fixed drive in the BIOS (Drive 0 or master), and an additional drive is connected to the same IDE controller card (drive 1 or slave), the second drive will also be tested and recognized. Thus, if the removable media drive 210 did not have a VIRTUAL CARTRIDGE mode, the other fixed disk drive 230 would not be recognized.

B. Providing Boot Capability For Removable Media Drives

After the BIOS has tested the removable media drive 210 for availability, the boot sequence proceeds. Next, the BIOS will check for a floppy drive to boot. If a floppy diskette is inserted into the "A" drive, the BIOS will attempt to boot the operating system from that diskette. If no floppy is present, the boot will proceed to the first fixed drive, typically "C." As with the floppy, a user may want to boot from the removable media drive 210. To provide this capability, the removable media drive 210 must be configured in CMOS 226 as the first fixed drive in the system (i.e. drive "C"). This also requires the removable media drive 210 to be selected as the master (i.e., drive 0) on the IDE interface.

Without the benefit of the present invention, in order to boot of off the removable media drive 210, media would be required to be present during all boot sequences. Moreover, the user would be required to always boot from the removable media drive 210 and any media replaced during the operation would have to have part of the operating system present. To alleviate these drawbacks, according to a further aspect of the presently preferred embodiment, a capability is provided to boot from any drive in the system. As will be described more fully below, this capability relieves the need to keep media in the removable media drive 210 during the boot sequence by detecting the absence of media and redirecting the boot sequence to another fixed disk drive (e.g., drive 230).

1. Providing a Substitute Master Boot Record

With the removable media drive 210 configured as drive "C," the boot sequence proceeds. As indicated in FIG. 2 (step 40), the BIOS requests a MBR from drive "C," which conventionally contains a boot program of one sector in length. From the perspective of the removable media drive 210, this request appears as a request for the sector at cylinder zero, head zero, and sector one (i.e., the cylinder registers 315, 316, set to zero, the head indicator bits in the device/head register set to zero, the sector number register set to one, the sector count set to one, and the command register set to read). Conventionally, the drive would then read the first sector from the media and transfer the sector to the processor 220.

According to the present invention, however, the MBR is provided from ROM 322 rather than the media. This providing of the MBR from ROM 322 is done according to one of two methods: if media is present, the MBR is read from the first sector, the partition tables are extracted and merged with the partition table of the replacement MBR stored in the removable media drive ROM 322, and the substitute MBR is returned; if no media is present, the substitute MBR is provided with an artificial partition table. According to either method, the normal MBR program code is replaced by a ROM based master boot record code stored in ROM 322 (hereinafter referred to as the "Universal Boot Record" (UBR)), which allows a program residing on the removable media drive 210 to gain control of the boot sequence.

In order to "trick" the BIOS into accepting the UBR as the real MBR, the UBR contains all of the required attributes, i.e., the last word of the sector contains the signature AA55 hexadecimal. Thus, the BIOS assumes that the data provided by the removable media drive 210 is the MBR and passes control to the UBR. Once in control of the boot sequence, the UBR makes requests to the removable media drive 210 to provide additional blocks of data, which contain a more complete boot program. The one sector long UBR is not of sufficient size to perform all of the required steps to allow booting from any fixed drive. Moreover, according to the presently preferred embodiment and as will be described more fully below, the UBP also contains the removable media disk driver that gets hooked to MS-DOS and provides the capability of handling the aspects of removability not support by MS-DOS disk services.

2. Universal Boot Record Gains Control of the Boot Process

Figure 2B:
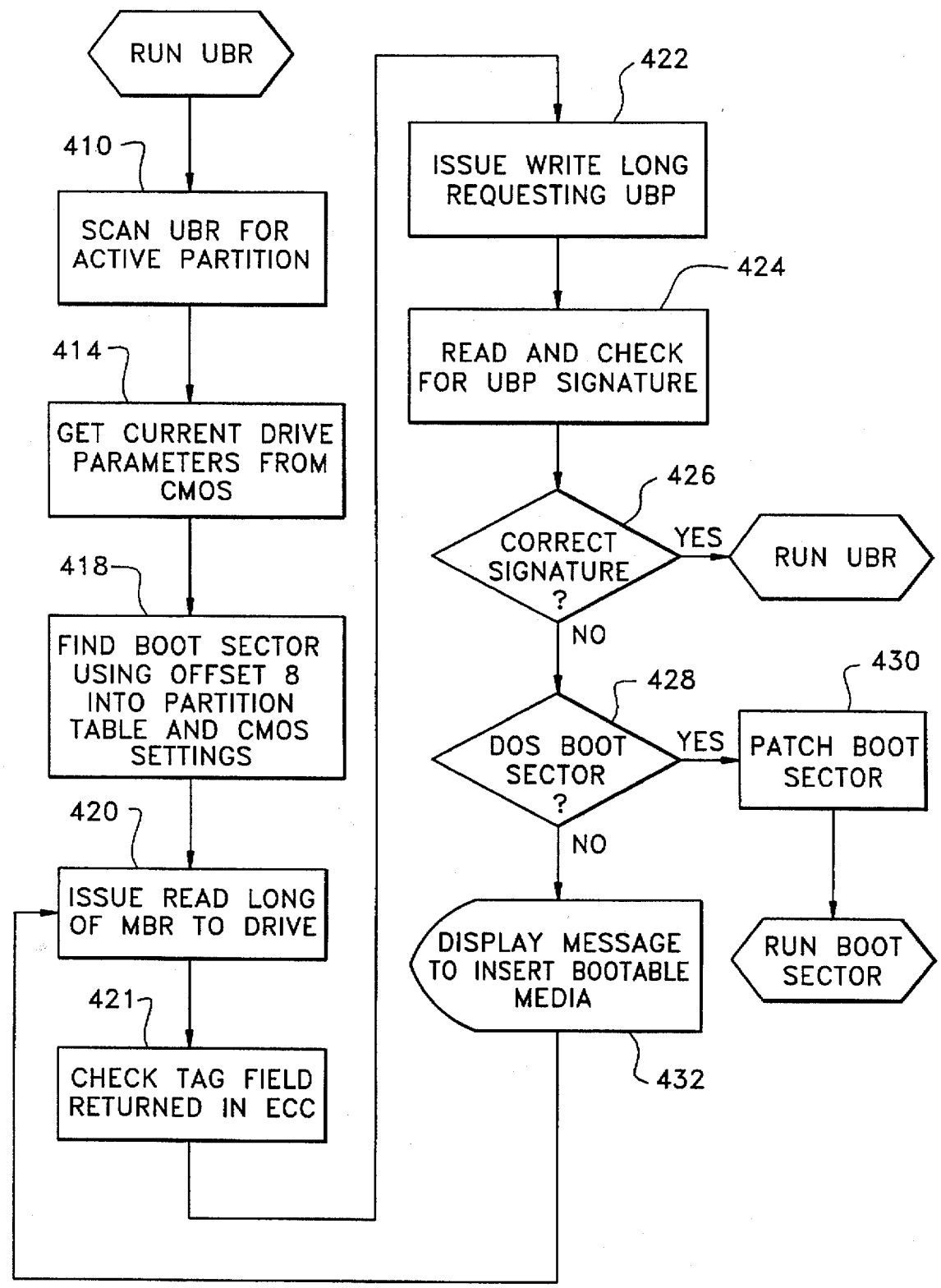
FIG. 2B is a flow chart of the process of the substitute master boot record (UBR) gaining control of the boot sequence in accordance with the present invention.

FIG. 2B presents a flow chart of the function of the UBR as it executes on the processor 220. Initially, the UBR scans its partition tables at offset 0 (e.g., 1BEh, 1CEh, etc.) to find an active partition (step 410). In general, there will be a single partition for the removable media. The UBR will call to the BIOS to retrieve the current drive settings contained in CMOS 226 (step 414).

Those settings are then used by the UBR to convert the "Partition Start Sector," field contained in the partition table at offset 8, to CHS (step 418). Thus, when the UBR calls to read the boot sector in CHS mode, the UBR will read the proper sector from the drive. If the media capacity and format information for the removable media drive 210 were universal, the process of locating the boot sector would be straight forward. The values stored in the CMOS would be the values used to determine the location of the boot sector. However, the removable media disk drive 210 is designed to support a variety of media sizes (e.g., 100 megabytes, 200 megabytes). Moreover, the media itself may have been initially formatted on a removable media drive from a variety of controller standards and thus the CMOS settings in the PC 200 for the number of cylinders, heads and sectors will not accurately reflect the values used on the PC in which the media was originally formatted. Because it is desirable to support the removable media regardless of the drive in which it was formatted, these differences must be taken into account. For example, if the drive in which the media was formatted is a SCSI drive, the CMOS settings would indicate 64 heads, 32 sectors. By contrast, the IDE standard requires that the number of heads be less than 16.

Next, it must be determined that this is a compatible drive i.e., that it is a removable media drive containing the special boot software. A READ LONG command of LBA 0 is issued to the drive 210 (step 420). The drive returns the data requested along with the Error Correction Code (ECC). However, the removable media drive 210 returns a special tag field in place of the standard ECC (step 421). The tag field returned will contain four bytes of tag information "E," "R," UBP size in sectors, and a checksum, thus indicating to the processor 220 that a removable drive having the universal boot capabilities is attached.

From the perspective of the drive, if a READ LONG of LBA 0 is requested, the drive interprets this as a test of the drive for compatibility. Thus, the UBR from removable media drive ROM 322 is once again returned to the processor 220. This time an ECC is appended with the special tag field.

After the drive has been tested for compatibility and determined to be a proper removable media drive 210, the drive 210 is commanded to provide the UBP from its ROM 322. According to a presently preferred embodiment, a WRITE LONG command is issued to the drive along with the special tag field embedded in the Error Correction Code field (step 422). The removable media drive 210 interprets such a command as an enable signal to provide the UBP. The next READ command issued is then interpreted by the drive 210 as the signal to provide the UBP.

To read the UBP, a READ command for the proper CHS of the boot sector is requested (step 424). The request is made through the disk access routines provided by the BIOS. When the READ command is received by the removable media drive 210, it should be interpreted by the drive 210 to return the UBP. However, in the event an error occurs, the drive should interpret this as a read of the boot sector. In either event, the computer should boot. If the UBP is in control, the boot will occur according to the method of the present invention. If the boot sector is given control, a conventional boot will occur.

Other methods can be used to accomplish the same goal of transferring the UBP from the drive ROM 322. For example on an IDE drive, the UBR can issue an F0 hexadecimal (defined by the present invention to be "UBP Load Enable") into the command register 318. The controller 320 will then transfer this command to the CPU 330, which will interpret it as a request for the UBP, and place the length of the UBP in the sector count register 313. The CPU 330 will read the UBP from the ROM 322 and transfer the UBP to the Buffer RAM 326. The UBP will then be transferred by the controller 320 over the IDE bus to the processor 220, where it will be loaded into RAM 224.

After the UBP is loaded into RAM memory 224 on the processor 220, the UBR will check the code to ensure that the code is complete. In particular, the signature of the last sector will be checked. A signature word of AA55h indicates that this is the UBP (step 426). If the signature is incorrect, the first sector transferred will be checked to see if it is a valid DOS boot sector (step 428). If the first sector is a valid DOS boot sector, correct values will be placed in the boot sector image in memory to enable a boot. Specifically, the sectors per track field (offset 18h), the number of heads field (offset 1Ah) and the physical device field (offset 24h) will all be updated to reflect the proper values. The sectors per track and number of heads reflect the values stored in CMOS 226 (step 430). A normal DOS boot should result. If no valid boot program is provided, a message will be displayed to put a bootable cartridge into the drive 210 (step 432), and an attempt is then made to re-load the Boot Sector.

3. Control Passes to the Universal Boot Program

Figure 2C:
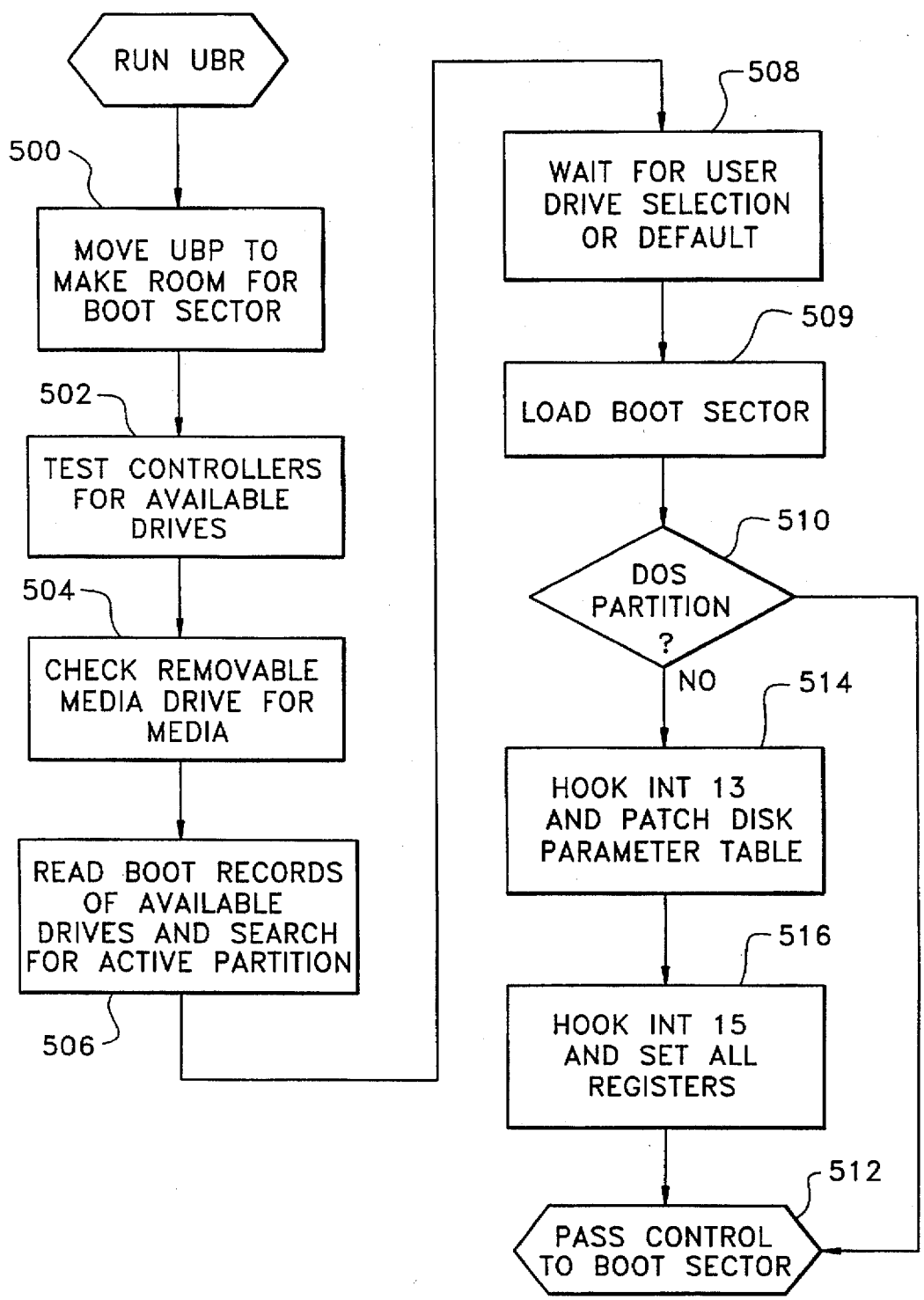
FIG. 2C is a flow chart of the process of the UBP finding and loading a valid boot sector, in accordance with the present invention.

FIG. 2C present a flow chart of the events that occur upon execution of the UBP by the processor 220. The UBP loads into memory and continues with the substituted boot sequence. However, the UBP was loaded into the location of the conventional boot sector. Now, a real boot sector must be read from the drive 210 or 230. Therefore, the UBP copies itself to a new location in memory, out of the way of the boot sector (step 500). Next, a genuine boot sector can be loaded from a bootable drive.

All available controller cards 227 are tested for bootable drives (step 502). After all drives have been tested for availability, a "Get Media Status" command (DA hexadecimal) is sent to the removable media drive to determine the availability of media. This command signals the drive 210 to leave the VIRTUAL CARTRIDGE mode (FIG. 1C, state 1000) or READY NO DRIVER mode (FIG. 1C, state 1002). If the drive 210 has media present, then it transitions into READY DRIVER mode (FIG. 1C, state 1016). Otherwise, the drive 210 transitions to a FAIL NO MEDIA state (FIG. 1C, state 1012). After receiving the Get Media Status command, the drive 210 reports the presence or absence of media in the status register 318 and error register 312. If there is an error, the drive 210 sets the status register 318 to 51 hexadecimal to indicate that bits are set in the error register 312. Bit one in the error register 312 indicates no media present if set to 1 (step 504). As previously indicated, the drive transitioned out of a pre-driver state. The drive 210 must be returned to a pre-driver state because the driver is not yet available. A soft reset will be issued by the UBP to the drive 210 to return it to a pre-driver state (state 1000 of 1002).

After finding the available drives, the UBP reads the master boot records from each drive. These master boot records are then scanned for active partitions (step 506). If an active partition is found, the boot sector for that partition is loaded into memory as a preliminary check that the partition is bootable. If no active partition is found, then the boot sector of the first valid partition entry is read and checked for bootability. As partitions are found that have valid data, they are added to a list of available bootable partitions. Moreover, the BIOS is queried for available floppy drives and they are added to the list. After building the list of bootable drives and partitions, a message is displayed to determine the users preference for a boot device (step 508). Booting proceeds by reading the boot sector from the drive requested. If no drive is requested, booting proceeds from the removable media drive 210, if media is available. Otherwise, the next bootable drive is selected. The boot sector is loaded from the selected drive (step 509). After loading the boot sector, the UBP checks the partition type (step 510). If the boot sector is not an MS-DOS partition, control is passed to this boot sector and the role of the UBP is ended (step 512).

If, on the other hand, the boot sector is an MS-DOS partition, the boot sector contains variables that reflect the number of heads, the number of sectors, and the physical drive number. These variables were written to the boot sector during the formatting process. According to an aspect of the present invention wherein booting from any drive or any cartridge in the removable drive is supported, these variables in the boot sector that are read into RAM memory 224 are updated. The hard drive address is set to the current physical address of the hard drive. Additionally, for the removable media drive, the sector and head values are set to the correct values for the removable media, the sector and head values are set to reflect the current CMOS values. As will be described in detail below, anytime a new boot sector is read into memory by DOS, these parameters must again be updated by the removable media driver.

In a typical fixed disk, these values will likely be correct. However, a user may have formatted the drive as drive "C" initially, but later moved the drive to drive "D." In such a case, the physical drive letter stored in the boot sector will be inaccurate and must be corrected. However, in the case of removable media drives, the user very likely will have formatted the cartridge on a different drive. For example, the cartridge may have been formatted on a SCSI drive located at drive address "E." Therefore, the boot sector variables must be patched.

To make the appropriate changes to the boot sector image, the UBP gets the number of sectors and heads (from CMOS in the case of other fixed disk drives). Then, at offset 18h in the memory resident boot sector, the UBP writes the value of sectors per track. At offset 1Ah in the memory resident boot sector, the UBP writes the value of heads. Finally, at offset 24h of the memory resident boot sector, the UBP writes the physical drive number (e.g., 80h for "C," 81h for "D") (step 514).

After the memory resident boot sector is copied and patched, DOS must access the patched table for subsequent disk accesses. Vector 41h generally, points to this portion of the memory resident boot sector (referred to as a "Disk Parameter Table") The UBP replaces the address pointed to by vector 41h to point to the modified boot sector image, thus, ensuring DOS will use the correct values in making disk accesses (step 516).

After all of the appropriate adjustments, control will pass to the newly loaded boot sector. Significantly, a portion of the UBP is a driver that remains resident after DOS has loaded, even when booting from another fixed disk drive. As is explained more fully below, to properly attach the driver to DOS, interrupts must be set to allow the UBP to "awaken" at the proper time to connect its driver to MS-DOS.

IV. Loading the Device Driver

The attachment of the removable media driver to DOS consists of two distinct parts. First, the UBP sets interrupts to monitor the DOS loading process, restores registers so that the boot process appears normal to DOS, then passes control to the boot sector. Second, during the boot sector execution and the subsequent DOS loading process, the UBP monitors the loading process for the precise time when the removable media driver can be attached, and replaces the physical drive number in portions of DOS as it is loaded into memory to support booting from any drive.

A. Hooking DOS Interrupts

The desired boot sector was found and loaded, as described above. However, the driver to support the removable media drive 210 must adjust itself during the ensuing DOS loading process to allow DOS to recognize it after the DOS has fully loaded. FIG. 2C presents the flow diagram for loading the removable media driver according to the present invention. Essentially, the driver will move to an area of RAM in the top of conventional memory and encapsulate the DOS driver in IO.SYS associated by DOS with the removable media drive 210. Additionally, calls to INT 13 and INT15 will be trapped and handled by the removable media driver. In order to hook the DOS driver properly, a significant portion of DOS must have been loaded by the boot sector. The moment when DOS has sufficiently loaded is determined on the fly during the DOS loading process. Referring now to FIG. 2C, the UBP loads the removable media driver portion of the UBP into a the highest available unused RAM 224 location and decrements the amount of available RAM memory by the size of the resident removable media driver (step 550). The removable media will reside at this location during the ensuing DOS operations, and the attachment process can proceed. An "Initialize Device Parameters" command is sent to the drive 210. When received the controller 320 stores the new values and uses those values for further communications with the processor 220 (step 551). The disk service pointed to by INT 13 is replaced to point to the UBP driver (step 552). Thus, whenever disk services (INT 13) are requested, the UBP driver will intercept the call and execute.

Once the interrupts are set, all registers in the processor CPU 222 are set as if a conventional MBR had loaded a conventional boot sector. In the present embodiment, wherein an Intel 80×86 is the CPU 222, the DS:SI registers are set to the partition table entry for the active partition; the ES:BX registers are set to the address of the boot sector in memory; the DH register is set to the data value of the first byte of the partition table entry; the DL register is set to the physical drive number (e.g., physical drive "D" equals 81*h*); and, register CX is set to the data from the second word of the partition table entry (554). After the registers are properly set, control is passed to the genuine DOS boot sector (see FIG. 2 Step 90).

B. Monitoring the DOS Loading Process

The loading of MS-DOS must be monitored so that the UBP driver can attach itself to the DOS environment. In a conventional DOS booting sequence, the drivers are loaded by DOS. Therefore, DOS makes all the necessary adjustments. A user adds the required device driver to the CONFIG.SYS file. Near the end of the boot sequence, DOS scans the CONFIG.SYS file for drivers to load. The drivers are loaded and properly attached to the DOS environment. If the user fails to add the driver to CONFIG.SYS the device will not function properly.

According to an aspect of the present invention, the removable media driver is loaded automatically and before DOS loading is complete. Thus obviating the need for the user to add a driver to the DOS CONFIG.SYS file. This automatic driver loading makes the integration of the removable media driver simple and transparent to the user. No additions to CONFIG.SYS are made. However, by loading the driver before DOS, the attachment of the driver to DOS becomes the responsibility of the driver. Thus, the driver has the responsibility of performing all of the housekeeping functions that would conventionally be performed by DOS. Because the driver is loaded into the PC before DOS is loaded, it is too early in the boot process to attach the driver. However, before DOS has loaded other device drivers, the removable media driver should already be available to the PC system.

During the DOS loading process, each time an INT 15 is executed, the UBP is awakened (as described above, the INT 15 pointer was replaced before control was passed to the boot sector). At each awakening, the UBP determines if enough of DOS has loaded to start the process of attaching the removable device driver to DOS. When the UBP has finished its determination, it makes adjustments to complete the driver attachment as needed, then calls the genuine INT 15 routine to allow the requested function to occur.

According to the presently preferred embodiment, to make the proper attachment of the driver, the UBP must distinguish between DOS versions of 5.0 through 6.22 and DOS version 7.0. As is described more fully below, that version distinction determines the adjustments necessary.

The UBP follows an eight step process in making the attachment. First, if the INT 15 function was not C0 then this is not the correct point in the loading process. Complete the INT 15 call and return.

Second, get the return address from the stack. That offset value must be greater than 10h to prevent a memory protection error on the ensuing steps. Thus, if the offset value is less than 10h, complete the INT 15 and return.

Third, if the value of the data at the return address-4 is not equal to C0B4h, DOS has not sufficiently loaded. Complete the INT 15 and return.

Fifth, compare 6 bytes starting at the return address-12 to 75h,02h,33h,C0h,2Eh,A2h. If the values match this is DOS version 7.0. The UBP must then patch the boot drive letter.

Sixth, the drive letter is pointed to by the return address-6. Before patching, the UBP checks the high byte at that address. It should be F8h. If it is then, the UBP puts the boot drive letter into the lower byte (note that in this case the drives are represented as "A" equal 0, "B" equal 1, etc.). After the drive letter is patched, the INT 15 call is made.

Seventh, this may be a different DOS version. Compare the values of the 10 bytes starting at return address-14 to 8Eh,D2h,BCh,00h,07h,FBh,51h,8Ah,E5h,50h. If the values do not match, make the INT 15 call and return.

Finally, if the values match, then the drive letter must be patched. For earlier DOS versions, get the third word from the stack. If the high byte is F8h, then put the boot drive letter in the lower byte.

If the boot drive patch was made, the UBP begins monitoring the INT 15 calls for an INT 15 function 88 call. This is an indication that a sufficient portion of DOS has loaded. DOS is nearing the load point wherein the removable device driver may be attached. To make the final determination a new DOS service is monitored—INT 21.

When DOS issues its first call to INT 21, the UBP awakens once again. At this time, IO.SYS is now loaded into memory and, because the pointers necessary to encapsulate the DOS disk services driver are now in place, DOS is stable enough to allow attachment of the removable media driver.

To start the attachment process, the UBP must replace the driver that DOS has attached to the removable drive. DOS keeps the driver information in a Device Parameter Block (DPB). The DPB for all drives are kept together in a linked list with the first link pointing to the DPB for drive "A", the second for drive "B", the third for drive "C", and so on. The UBP must find the DPB for the driver servicing the removable drive—drive "C", change the driver header to point to the new removable media driver and set the attributes to indicate a removable media drive.

Figure 3A:
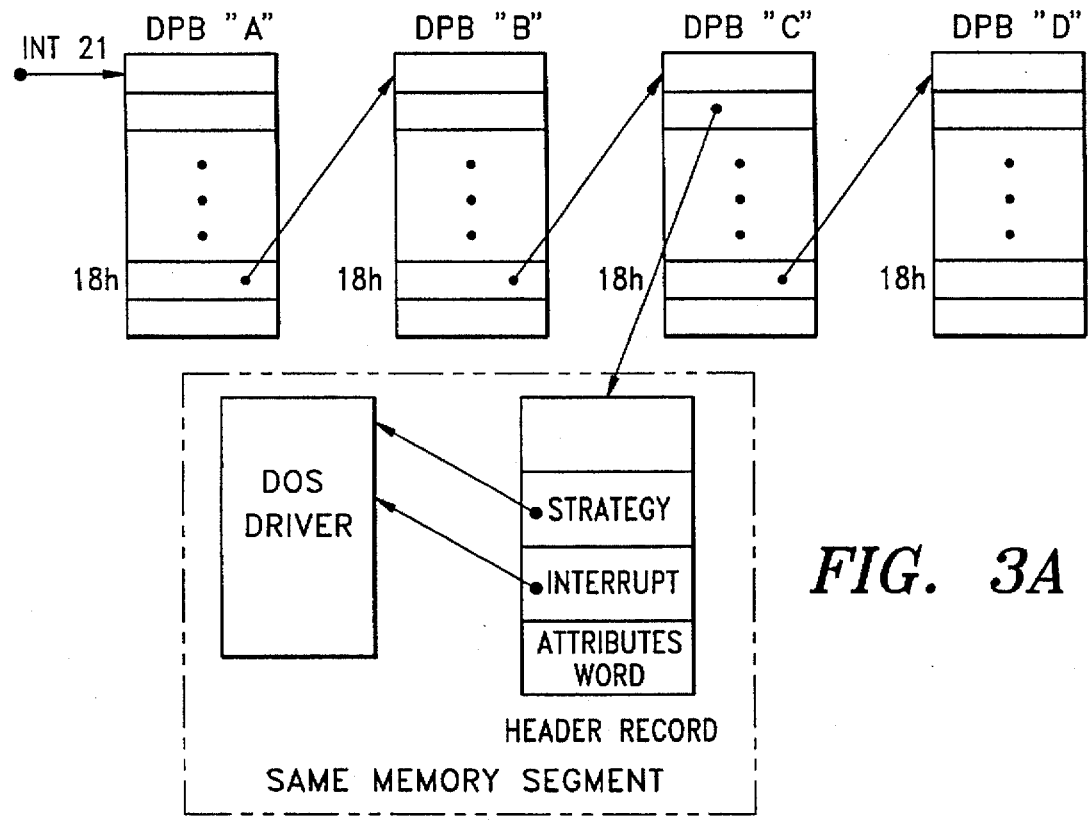
FIG. 3A is a graphical depiction of an operating system driver environment before the removable media driver of the present invention is loaded.
Figure 3B:
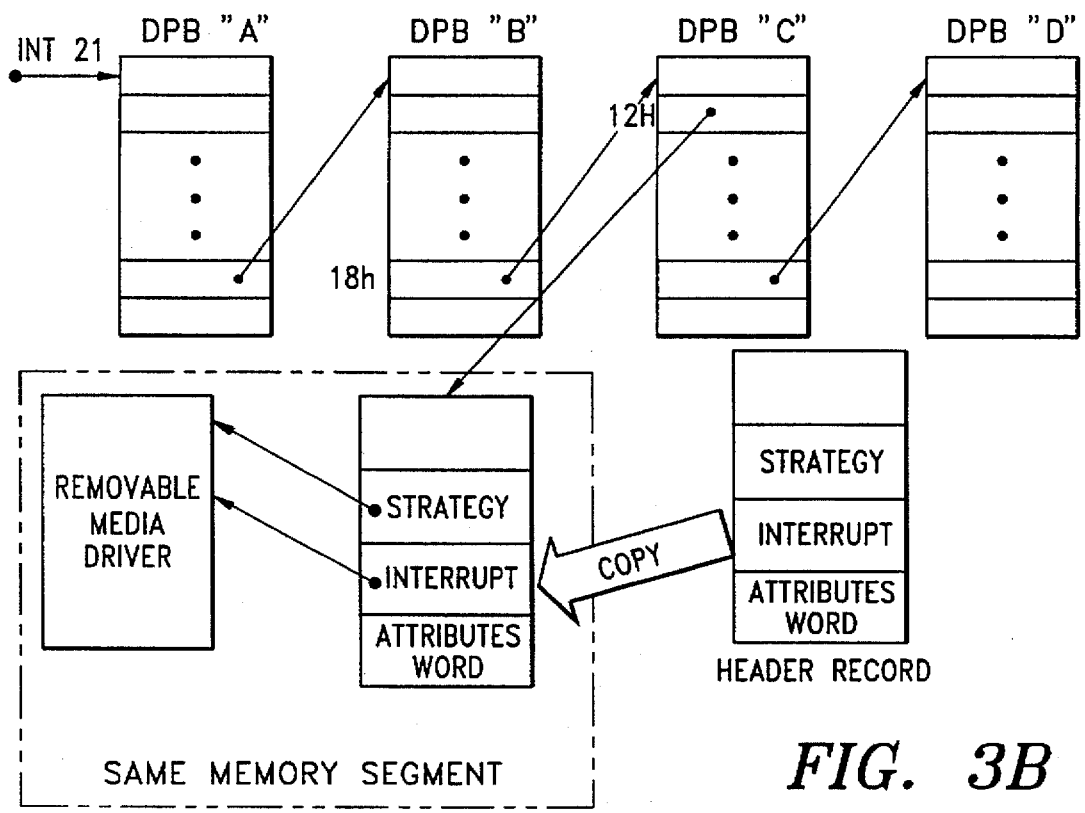
FIG. 3B is a graphical depiction of the DOS driver environment after the removable media driver of the present invention is loaded.

FIGS. 3A and 3B graphically depict the process of attaching the removable media driver to DOS. FIG. 3A represents the undisturbed memory configuration before the removable media driver is attached. To find the first DPB, a DOS general services call to INT 21 function 52 provides, at offset 0, a pointer to a pointer to the DPB of drive "A." At offset 19h of the DPB is the pointer to the next DPB in the linked list. By following the linked list to the third DPB, the UPB can find the DPB of all the drives recognized by DOS. Significantly, the removable media drive 210 must be drive "C" or the UPB would never have gained control of the boot process. Each DPB points to a driver header record (offset 13h) where variables are stored pertaining to the driver.

FIG. 3A illustrates the configuration after the removable media drive is attached to DOS. After locating the proper UPB, offset 13h points to the driver header record of the device driver servicing the removable media drive. The UPB locates the driver header record and copies it to local storage within the removable media driver memory allocation and sets the header offset within the DPB to point to the copied header. The attributes word is found at offset 4 in the header. The UPB then sets bit 11 of that attribute word so that a DOS routine examining the driver header record will understand that the removable media drive 210 supports removability.

In addition, the UBP changes the pointers to the strategy and interrupt routines of the DOS driver within the header to point to the removable media driver. Now the DOS driver is embedded within the removable driver. When DOS calls its driver, the removable media driver gains control first.

The removable media driver is now hooked and the original INT 21 call that the UBP monitored to awaken is serviced and the UBP is unhooked from the INT 21.

It is desirable to remain hooked to INT 21, as well as other DOS services, for example, INT 2F. Such hooks give the driver added capability and flexibility. However, the INT 21 vector will not remain pointed to the removable media driver. While DOS continues to load, it will continuously refresh the INT 21 vector. Thus, destroying the ability of the removable media driver to trap INT 21 calls reliably.

According to another aspect of the present invention, the removable media driver remains hooked to INT 21 via the trap capabilities of the CPU 222. When the vectors become stable (i.e., DOS has completely loaded) the tracing is turned off and INT 21 and other vectors can be replaced to hook back to the removable media driver.

To accomplish this function using the CPU trap capabilities, the vector INT 1 is set to point to the removable driver and the trace flag is set. Thereafter, every instruction executed on the CPU 222 can be monitored by the removable media driver. Of course, this tracing can impose a severe efficiency penalty. To minimize the impact, the tracing is enabled at the last possible moment. This moment is before CONFIG.SYS is loaded. After that point, DOS repeatedly refreshes the INT 21 vector. Thus, when there is an INT 21 function 3D call made with the DS:DX registers containing "\CONFIG.SYS" INT 21 can no longer be reliably captured by replacing its vector to point to the removable media driver. Instead, the CPU trapping technique is employed.

CPU trapping can be turned off once the INT 21 vector becomes stable. This occurs when an INT 21 function 48 call is made with the register BX containing FFFFh. So, the CPU trapping continues until these values are obtained. Afterward, the CPU trapping is relinquished and the INT 21 or other INT vectors can again be reliably replaced to point to the removable media driver.

V. Operation of the Device Driver

Conventionally, a device driver that handles drive communication would simply replace the DOS disk services with its own substituted disk services. However, DOS disk services developed in conjunction with DOS and contains many undocumented features. Thus, according to an aspect of the present invention, the removable media device driver enhances the features of the DOS disk services without replacing them. As will be described more fully below, this enhancement is accomplished by encapsulating the DOS disk service within the removable media driver. The removable media driver provides this enhancement by checking the disk services call for removability services and making the necessary extensions to support removability before calling the initially called DOS disk services routine.

The main removability functions supported by the driver are "check media status" and "rebuild BIOS parameter block." For typical fixed disk drives, DOS does not expect the media to change. Thus, "check media status" does not return a media change indication. Additionally, the DOS disk services will not access the drive to service a "rebuild BIOS parameter block" command because the media never changes.

Figure 2D:
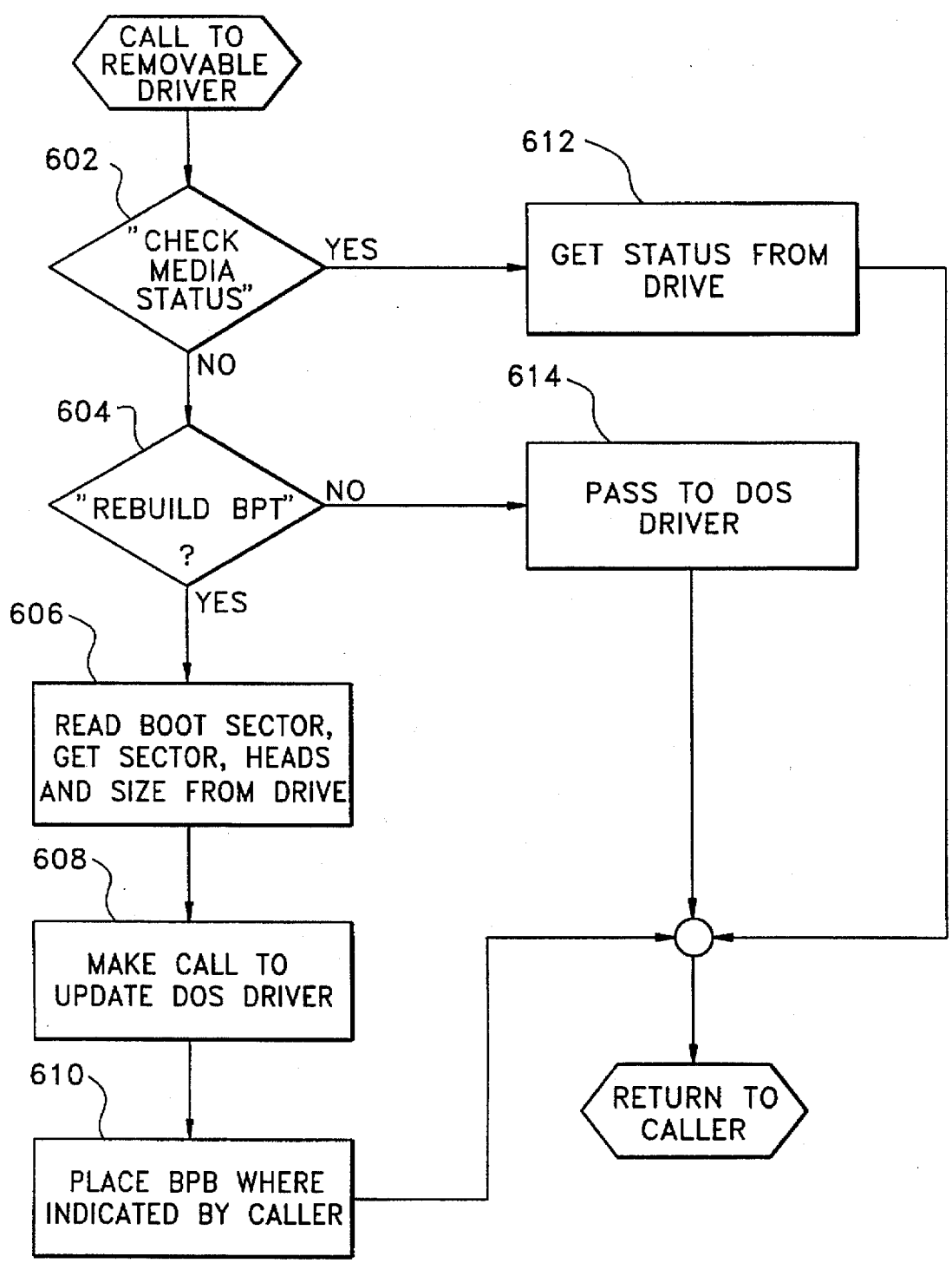
FIG. 2D is a flow chart illustrating the operation of a removable media driver in accordance with the present invention.

FIG. 2D depicts a flow diagram of the current removable media driver service. Initially, a call is made to the removable media driver. If the command is to "check media status," the removable media driver intercepts the command and process it (step 602). In response, the driver issues a "Get Media Status" command to the removable media drive 210, as described in detail above (step 612). The drive 210 will report the status of the media in the status and error registers. If the media has changed, the removable media driver reports that change to DOS. DOS will subsequently make a "rebuild BIOS parameter block" call to the removable media driver. If the media is not present, this will be reported to DOS. DOS will respond by sending the user the conventional "ABORT, RETRY, FAIL?" message.

If a "rebuild BIOS parameter block" command is received, the removable media driver services this call because the DOS device driver does not rebuild BIOS parameter blocks for fixed disk drives (step 604). The removable media driver reads the partition table and boot sector from the drive. Then it issues an IDENT command to the drive to get the number of heads and sectors and currently loaded media size (step 606).

Then the removable media driver saves the request structure pointed to by the original strategy call and makes a call to the DOS device driver to rebuild its internal structures via a "set device parameters" call (step 608). When that call has completed, the removable media driver updates the BIOS Parameter Table pointed to by the previously saved request structure. In particular, at offset 18h in the BIOS parameter table, the removable driver writes the value of sectors per track. At offset 1Ah in the BIOS parameter table, the driver writes the value of heads (step 610).

All other commands are processed by the removable media disk drive as any conventional fixed disk. Therefore these commands are passed to the DOS fixed disk driver (step 614). When the command is processed control is returned to the calling program.

As the foregoing illustrates, the present invention is directed to methods and apparatus for booting a computer system and loading drivers from a removable media disk drive. In a PC system that boots an operating system from a storage device, the present invention provides a means for booting from a removable media drive. It is understood, however, that changes may be made to the embodiments described above without departing from the broad inventive concepts thereof. For example, while the method of the present invention is particularly well suited to an IDE interfaced removable media drive, the same method may be used to boot a PC system from a removable media drive connected to a different interface, such as SCSI. Accordingly, this invention is not limited to the particular embodiments disclosed, but is intended to cover all modifications that are within the scope and spirit of the invention as defined by the appended claims.

What is claimed is:

1. In a storage device having removable media and a memory area, wherein the storage device is connected to a processor and wherein the processor performs a boot sequence to retrieve an operating system from the storage device, a method of commandeering the boot sequence, comprising the steps of:

(a) receiving requests from the processor to determine the status and availability of the removable media;

(b) if no removable media is available, providing a simulated response of successful completion to said requests such that the storage device presents an indication that removable media is available;

(c) if media is available, performing said requests upon said media;

(d) subsequent to said test requests, receiving a read request to provide a master boot record from said removable media; and, (e) providing a substitute master boot record from said memory area on the storage device instead of the master boot record from the media such that said substitute master boot record will gain control of said processor when said substitute master boot record is executed on said processor.

2. The method of claim 1 wherein said memory area on the storage device is a Read-Only Memory device.

3. The method of claim 1 wherein said substitute master boot record provides for the boot sequence to continue from any storage device connected to the processor.

4. In a storage device having removable media, wherein the storage device is connected to a computer system having a processor, wherein the processor tests the storage device by checking a status of the storage device during a boot sequence such that the processor will not access the storage device if the status indicates that the storage device is not ready during the boot sequence, a method of inducing the boot sequence to accept the storage device whether or not removable media is available, comprising the steps of:

(a) receiving requests from said processor to determine the status and availability of the media;

(b) if no media is available, responding to said test requests with a simulated status such that the storage device appears to have media available; and, (c) if media is available, performing said test requests upon said media.

5. In a computer system having a processor with a removable media storage device connected to said processor via an IDE disk controller card, the storage device having a memory area and the processor executing a BIOS to boot an operating system, a method of interrupting a standard boot sequence to integrate the removable media storage device into the computer system:

(a) starting the BIOS on the computer system;

(b) providing responses from the storage device to BIOS initiated requests to test the availability of the removable media storage device such that the storage device appears to the BIOS to have media available even if no media is available;

(c) providing the BIOS with a substitute master boot record from the memory area of the removable media storage device in response to a BIOS initiated request for the master boot record from the media;

(d) controlling the boot sequence from the substitute master boot record when the BIOS executes said substitute master boot record;

(e) extending the standard boot sequence capabilities by retrieving another program from one of said memory area and said removable media of the removable media storage device in response to said substitute master boot record requests; and, (f) retrieving a boot sector from one of the removable media storage device or another storage device.

6. The method of claim 5 wherein said memory area on the storage device is a Read-Only Memory device.

7. In a computer system having a processor, a BIOS and a first storage device that accepts a removable media, said first storage device being in communication with said processor, a method of booting an operating system program into said processor from one of the first storage device and another storage device, comprising the steps of:

(a) requesting a master boot record from the removable media of the first storage device;

(b) receiving a substitute master boot record from a memory area on the first storage device;

(c) signaling the first storage device that said substitute master boot record has gained control of said processor; and, (d) retrieving a boot program from said first storage device such that the booting can be completed from one of the first storage device and another storage device having a valid boot sector.

8. In a computer system having a processor in communication with a first storage device of the type that accepts a removable media, a method of installing a device driver in an operating system program during the booting of the operating system into said processor, comprising the steps of:

(a) requesting a master boot record from the removable media of the first storage device;

(b) receiving a substitute master boot record from a memory area on the first storage device;

(c) executing said substitute master boot record such that said substitute master boot record gains control of said processor and retrieves the device driver from the first storage device; and, (d) executing said device driver on said processor such that said device driver monitors the operating system loading process and attaches itself to the operating system based on a predetermined state of the processor.

9. In a storage device having removable media, wherein the storage device is connected to a processor and wherein the processor performs a boot sequence to retrieve an operating system from the storage device, an apparatus for commandeering the boot sequence, comprising:

(a) means for receiving requests from the processor to determine the status and availability of the removable media;

(b) means for responding to said requests such that the storage device presents a status indicating that removable media is available when removable media is not available such that said processor believes removable media is available;

(c) means for performing said test requests upon said media when said media is available;

(d) means for receiving a read request from the processor to provide a master boot record from said removable media; and, (e) means for providing a substitute master boot record from a memory area on the storage device instead of the master boot record from the media such that said substitute master boot record will gain control of said processor when said substitute master boot record is executed on said processor.

10. The apparatus of claim 9 wherein said memory area on the storage device is a Read-Only Memory device.

11. In a computer system having a BIOS, wherein the BIOS supports booting from a limited capacity removable media drive, a method of booting from a higher capacity removable media drive, comprising the steps of:

(a) configuring the computer system such that the BIOS recognizes the removable media drive as a first available fixed media drive;

(b) indicating to the BIOS during booting that the higher capacity removable media drive has media available whether or not media is available in the removable media drive;

(c) delivering a substitute master boot record to the BIOS when an initial request is made from the BIOS to the removable media drive for a master boot record from the media;

(d) when the BIOS executes said substitute master boot record, loading additional programs by the substitute master boot record from the removable media drive such that additional operating system support is added for the removable media drive;

(e) loading a valid boot sector; and, (f) passing control to said valid boot sector such that normal booting resumes.

12. The method as recited in claim 11, wherein the step (b), comprises the steps of:

(i) receiving requests from the BIOS to determine the status and availability of the removable media;

(ii) if no removable media is available, responding to said requests such that the storage device presents a status and data indicating that removable media is available; and, (iii) if media is available, performing said requests upon said media.

13. The method as recited in claim 11 wherein the step (c) further comprises the step of loading said substitute master boot record from a Read-Only Memory device within the removable media storage device.

14. The method as recited in claim 11, wherein the step (d) comprises the steps of:

(i) loading a boot program having a device driver portion from the removable media drive;

(ii) passing control from said substitute master boot record to said boot program such that said boot program can search the removable media drive and other storage devices for at least one boot sector;

(iv) setting said computer system such that said boot program can attach the driver portion of said boot program when a sufficient portion of an operating system is loaded.

15. The method as recited in claim 14, wherein the computer system has a CPU having at least one interrupt, and wherein the step (iv) comprises setting said at least one interrupt such that said boot program executes when said at least one interrupt is called such that said boot program can attach said driver portion to said operating system.

16. The method as recited in claim 14, wherein the computer system has a CPU having a trace capability, and wherein the step (iv) comprises setting the trace capability to execute said boot program when a predefined instruction is executed on the CPU such that said boot program can attach said driver portion to said operating system.

17. In a storage device for use in a computer having a processor, a method of booting an operating system into the processor, comprising the steps of:

(a) storing a substitute master boot record in a first memory area in the storage device;

(b) storing a boot program in a second memory area in the storage device;

(c) receiving a request from the processor for a master boot record;

(d) providing said substitute master boot record from said first memory area such that said substitute master boot record gains control of the processor and requests the boot program from the storage device;

(e) receiving a request from the processor for the boot program; and, (f) providing said boot program from said second memory area such that said boot program retrieves a boot sector from the storage device or another storage device connected to the processor.

18. The method as recited in claim 17, wherein the storage device has removable media, comprising the further steps of:

(i) receiving test requests from the processor to determine the status and availability of the removable media;

(ii) if no removable media is available, responding to said test requests such that the storage device presents a status indicating that removable media is available; and, (iii) if media is available, performing said test requests upon said media.

19. The method as recited in claim 17 wherein said memory area on the storage device is a Read-Only Memory device.

20. The method as recited in claim 17 wherein said boot program provides for the boot sequence to continue from any storage device connected to the processor.

21. The method as recited in claim 17 wherein the step (e) comprises the steps of:

(i) signalling the storage device that said substitute master boot record has gained control of said processor; and, (ii) retrieving the boot program from the storage device such that the booting can be performed on any storage device having a valid boot sector.

22. The method as recited in claim 21 wherein the signalling of step (i) comprises using READ LONG and WRITE LONG commands with signalling information embedded in place of error correction codes.

23. The method as recited in claim 21 wherein the step (i) comprises using a command recognized by the drive as a enabling the boot program.

24. In a computer having a processor and a storage device, wherein said processor has a BIOS program for starting a boot sequence that loads an operating system into the processor from the storage device, a method of gaining control of the boot sequence from the BIOS and loading a device driver while booting an operating system, comprising the steps of:

(a) setting said drive as the first fixed disk drive in the system;

(b) storing a substitute master boot record in the storage device;

(c) storing a substitute boot program in the storage device;

(d) at system start-up, after the BIOS requests a master boot record, providing said substitute master boot record in place of the requested master boot record;

(e) executing said substitute master boot record on the processor such that said substitute master boot record gains control of the boot process;

(f) after the substitute master boot record gains control of the processor, retrieving and transferring control to said boot program;

(g) after said boot program gains control of the processor, loading a valid boot sector;

(h) executing the boot sector such that the boot sector loads an operating system; and, (i) monitoring the execution of the boot sector such that at a predetermined time during the loading of the operating system, the boot program regains control of the system and connects a portion of itself to the operating system as a device driver.

25. The method as recited in claim 24, wherein the storage device is of a type that accepts a removable media, comprising the further steps of:

(i) receiving requests from the processor to determine the status and availability of the removable media;

(ii) if no removable media is available, responding to said requests such that the storage device presents data and a status indicating that removable media is available; and, (iii) if media is available, performing said requests upon said media.

26. The method as recited in claim 24 wherein said step (b) comprises storing said substitute master boot record in a memory device.

27. The method as recited in claim 26 wherein said memory device is a Read-Only memory device.

28. The method as recited in claim 24 wherein the step (g) comprises loading the boot sector from any storage device connected to the processor.

29. The method as recited in claim 24, wherein the processor has a CPU having at least one interrupt, and wherein the step (i) comprises setting said at least one interrupt such that said boot program executes when said boot sector makes a call to the at least one interrupt.

30. The method as recited in claim 24, wherein the processor has a CPU having a trace capability, and wherein the step (i) comprises setting said trace capability to execute the boot program when a predefined instruction is executed on the CPU.

31. In a storage device of a type that accepts a removable media, wherein the storage device is connected to a processor having a BIOS and wherein the BIOS performs a boot sequence to retrieve an operating system from the storage device, an apparatus for commandeering the boot sequence, comprising:

(a) storing means for storing a program code on the storage device such that said program code can replace a portion of the boot sequence;

(b) receiving means in communication with said processor for receiving requests from the processor to determine the status and availability of the removable media and to provide a master boot record from said removable media;

(c) means in communication with said receiving means for responding to said requests such that the storage device presents data and a status to the BIOS indicating that removable media is available when no removable media is available;

(d) means in communication with said receiving means for performing said requests upon said removable media when said media is available;

and, (e) means in communication with said storing means for providing a first portion of said program code on the storage device instead of the master boot record from the removable media in response to requests to provide a master boot record, such that said program code record will gain control of said boot sequence allowing the boot sequence to proceed from a storage device not supported by the BIOS.

32. The apparatus as recited in claim 31 wherein said program code comprises:

a first portion containing a substitute master boot record conforming to a master boot record format recognized by the BIOS; and, a second portion containing a boot program, wherein said boot program comprises a modified boot sequence program portion and an operating system extension portion.

33. The apparatus as recited in claim 31 wherein said program code is stored on the storage device in a memory device.

34. The apparatus as recited in claim 33 wherein said memory device is a Read-Only memory device.

35. In a computer system having a BIOS, wherein the BIOS supports a limited capacity removable media drive as a boot device for loading an operating system, a method of supporting a higher capacity removable media drive as a boot device comprising the steps of:

(a) configuring the computer system such that the BIOS recognizes the removable media drive as a first available fixed media drive;

(b) delivering a substitute master boot record to the BIOS when an initial request is made from the BIOS to the removable media drive for a master boot record from the media;

(c) when the BIOS executes said substitute master boot record, loading additional programs into the computer system from the removable media drive such that a removable media function is recognized by the operating system while the removable media drive is configured as a fixed media drive.

* * * * *